(12) United States Patent
Zechleitner

(10) Patent No.: US 7,142,334 B1
(45) Date of Patent: Nov. 28, 2006

(54) READING UNIT FOR A DOCUMENT

(75) Inventor: Dieter Zechleitner, Mehrnbach (AT)

(73) Assignee: Keba AG, Linz (AT)

( * ) Notice: Subject to any disclaimer, the term of this patent is extended or adjusted under 35 U.S.C. 154(b) by 0 days.

(21) Appl. No.: 09/646,284

(22) PCT Filed: Mar. 16, 1999

(86) PCT No.: PCT/AT99/00065

§ 371 (c)(1),
(2), (4) Date: Oct. 27, 2000

(87) PCT Pub. No.: WO99/48278

PCT Pub. Date: Sep. 23, 1999

(30) Foreign Application Priority Data

Mar. 17, 1998 (AT) ........................... 466/98

(51) Int. Cl.
*H04N 1/04* (2006.01)
*H04N 1/00* (2006.01)

(52) U.S. Cl. ...................... 358/474; 358/483; 358/496; 358/444; 358/406; 358/442

(58) Field of Classification Search ................ 358/483, 358/482, 444, 404, 497, 496, 474, 494, 472, 358/473, 406, 465, 461, 475, 512–514, 509, 358/523, 505, 442; 382/312, 313, 318, 319; 250/208.1, 216, 234–236; 399/211, 212
See application file for complete search history.

(56) References Cited

U.S. PATENT DOCUMENTS

| | | | |
|---|---|---|---|
| 4,295,167 A | 10/1981 | Wiggins | 358/412 |
| 4,491,961 A | 1/1985 | Sutton et al. | 382/270 |
| 5,157,518 A | 10/1992 | Ohtaki et al. | 358/461 |
| 5,325,217 A | 6/1994 | Nagler et al. | 358/506 |
| 5,434,681 A * | 7/1995 | Imamura et al. | 358/471 |
| 5,442,465 A | 8/1995 | Compton | 358/482 |
| 5,710,637 A | 1/1998 | Matsumoto | 358/400 |
| 6,166,832 A * | 12/2000 | Fujimoto | 358/484 |
| 6,441,928 B1 * | 8/2002 | Tuli et al. | 358/473 |
| 6,496,285 B1 * | 12/2002 | Fujimoto et al. | 358/475 |

FOREIGN PATENT DOCUMENTS

| | | |
|---|---|---|
| EP | 0 613 291 | 8/1994 |
| EP | 0 658 503 | 6/1995 |
| EP | 0 689 341 | 12/1995 |
| EP | 0 715 449 | 6/1996 |
| JP | 61 001167 | 1/1986 |
| JP | 61 166266 | 7/1986 |
| JP | 63 136293 | 6/1988 |
| JP | 05 007296 | 1/1993 |
| WO | 97 02698 | 1/1997 |

* cited by examiner

*Primary Examiner*—Cheukfan Lee
(74) *Attorney, Agent, or Firm*—Collard & Roe, P.C.

(57) ABSTRACT

The invention relates to a reading unit (1) for a document (2) having a control and/or evaluation device (44), incorporating a scanner device (25) for reading the document (2), and a guide mechanism (6) for the document (2) and a conveyor device (17) to effect a relative displacement between document (2) and scanner device (25). The control and/or evaluation device (44) cooperates with a compensating device (39) containing corrective values to correct the image signals (37) emitted by an optoelectric transducer (34) of the scanner device (25) in real time.

36 Claims, 5 Drawing Sheets

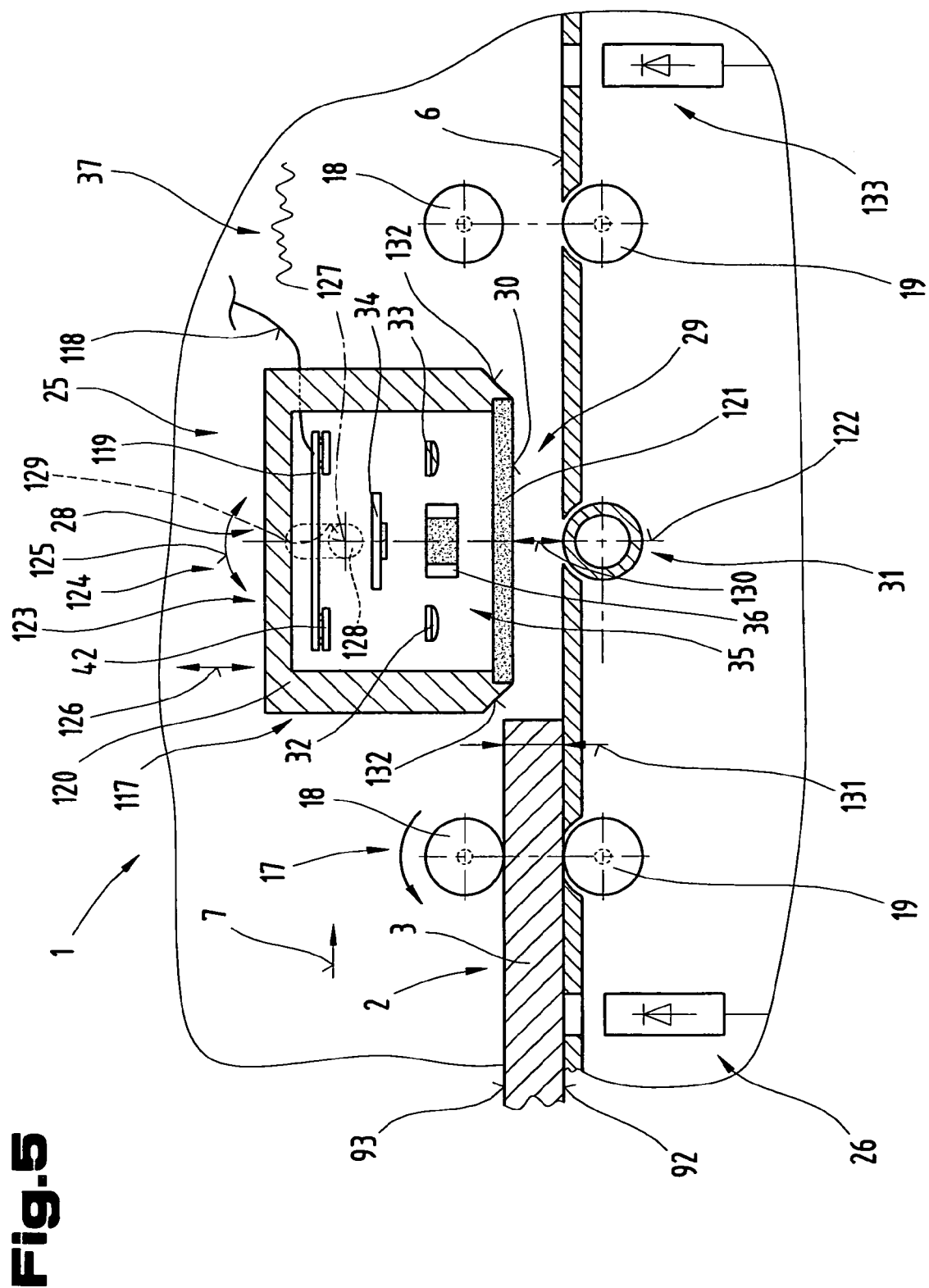

READING UNIT FOR A DOCUMENT

The invention relates to a reading unit for a document.

Various reading units for optoelectrically scanning documents are known, particularly printed documents and individual pages containing graphic illustrations. These reading units, commonly referred to as scanners, are widely used in homes and businesses and are operated by users with the requisite technical knowledge and by previously trained users. To use these known scanning devices, the document to be contactlessly scanned is duly positioned on a transparent plate. When the scanning procedure is manually started by the user, the scanning member is displaced relative to the stationary document whilst emitting light and the light and dark regions of the document detected. The disadvantage of these known devices is that the performance which can be achieved is severely limited.

An optoelectronic reading unit or scanner for a document is known from WO 97/02698 A1, comprising an array of several optoelectronic sensors and several light sources in the form of light emitter diodes. These components form an optoelectronic image detection device, which is connected to the scanner electronics in order to co-ordinate the optical scanning process. The corresponding scanner electronics also incorporate a compensating circuit by means of which the image signals supplied by the optoelectronic scanning device can be corrected or adjusted. The corrective data used for this purpose is stored in a memory device of the scanner electronics and can be read by the component taking charge of the corrections. When the optoelectronic scanning device is replaced, it may be that the memory containing the corrective and adjustment data is not replaced or updated which means that irrelevant corrective data may be used. In a situation such as this, the image data detected thereafter may be even more distorted.

A scanner with a corrective function is also known from EP 0 689 341 A2. In particular, the image signals detected during a scanning process above what is referred to as the flat bed of the scanner are compared with image signals detected when a document is inserted and the differences cancelled out. This correction circuit additionally has a memory device, in particular a non-volatile memory in the form of what is known as an EEPROM, in which the corresponding corrective values for compensating the respective image data are stored. This memory device for the corrective data is part of the scanner electronics and, in order to correct the image signals, is accessed by the corrective circuit, in particular by a microprocessor, as a means of directly controlling the corresponding connected memory device containing the corrective data. Again with this design, it may be that corrective data is used which is not adjusted to the respective optoelectronic scanning device.

U.S. Pat. No. 4,491,961 A also describes a circuit for correcting scanning signals generated by an optoelectronic scanning device. In this case, the image data detected by the optoelectronic scanning device in digital form is forwarded to a corrective circuit, which amends the image data received from the scanning head in accordance with predefined corrective values. The memory devices containing the corrective or compensating data co-operate directly with the corrective or compensating circuit. Yet again, there is no way of ruling out a situation in which the data used is inappropriate for the optoelectronic scanning device installed.

The underlying objective of this invention is to provide a reading unit which operates fault-free and therefore offers a high performance capability.

This objective is achieved by the invention due to the features discussed below. The advantage of this design resides in the fact that optimal scanning results are achieved in terms of quality and accurate document reproduction, without reducing the speed at which the documents to be scanned are processed. In particular, the intrinsic tolerances of the entire reading unit residing in both the mechanical and electrical as well as optoelectric components are cancelled out to the highest possible degree by the compensating unit. Accordingly, totally accurate image detection is achieved, thereby providing the basis for reliable evaluation of the imaging data. All the tolerances inherent in the components of the reading unit, which occur naturally due to the conveyor device, the optoelectric transducers and/or the illumination applied to the document, for example, can be compensated or balanced without detriment to the scanning speed and without detriment to the time needed to detect the image data because the image data is corrected by the hardware in real time. In other words, the image output data complete with tolerances from the scanning device is corrected and processed directly purely by means of compensating hardware. The electrical image signals emitted by the scanning device are run through the compensating device without delay on a hardware basis only, where the summed tolerances are eliminated.

Because of the large number of components cooperating with one another, different tolerances will always occur in every reading unit and specifically calibrated corrective values can be assigned to these individual tolerances to compensate for these tolerances so that optimum results can be achieved. Furthermore, the corrective data permanently stored is written to another memory device with a relatively faster access performance so that relatively high processing speeds can be achieved. Moreover, if the scanner device along with the optoelectric transducers is replaced, unsuitable corrective data will never be used because the memory unit for the corrective values forms a complete module of the reading unit, which can be replaced.

An embodiment is also of advantage because it obviates the need for computing and hence time-intensive corrective measures.

Also of advantage is an embodiment offering a structure that can be stored in total safety and is stable during operation.

Another embodiment is of advantage because the compensated image data can be forwarded without problem to peripheral data processing devices for further processing and/or evaluation.

Another embodiment also offers advantages because fixed and constant sequences in the reading unit and relatively time-intensive decision-making tasks or comparison operations performed on the basis of the system states are split up, thereby achieving short throughput times. The sequence control device, operated on a hardware basis only and designed in the form of a "state machine" in particular, takes charge of the constant sequences and the system-dependent sequences are controlled and determined by at least one microprocessor.

An embodiment offers advantages because standard and widely used communications interfaces are used which exhibit a high degree of reliability.

The objective of the invention is also achieved independently as a result of the features discussed below. The surprising advantages offered by the combination of these features reside in the fact that the image signals which can be picked up at the scanning device can be optionally compensated without delay and immediately transferred to an intermediate storage, which is directly connected via a bus card or interface card integrated in the personal computer. The sequence control device, which can be configured with a fixed programme, therefore acts as a complex transfer hardware unit, comparable in particular to a state machine, and the incoming image data is transferred directly into the main memory of the personal computer using the bus system internal to the processing system, which makes for considerable gains in speed due to the fact that data is transferred to the main memory of the personal computer purely by the hardware. Furthermore, as a result of the solution proposed by the invention, the standard interfaces of the personal computer commonly used by much of such equipment, e.g. the parallel interface and the serial interfaces, remain free and can also be used for printer units and other input and output devices, for example. Because the image data is transferred directly into the main memory of the personal computer, a high data transfer rate of several MB/s can be achieved, which is not possible with conventional data transfer systems, e.g. parallel interfaces, as a result of which image data detection and optical character recognition (OCR) can be run almost simultaneously.

In addition, a continuous data flow is produced without any significant intermediate storage of the image data, which means that documents and forms can be processed at relatively fast rates.

An embodiment is of advantage because it offers a bus system with a high performance capability and one which is also frequently used in modern personal computers, thereby bringing a high degree of operating safety.

An embodiment is also of advantage because it enables continuous data detection essentially without any time delay and avoids any accumulation of data which would otherwise place a high load on the memory and be time-intensive.

An advantageous embodiment since it produces very short running times and offers a compact control device.

An advantage of a further embodiment is that the microprocessor of the control and evaluating device is not subjected to high loads.

Another embodiment has the advantage of being built to a structure that requires little by way of maintenance and service and also enables the document to be scanned without gaps.

Another embodiment offers a robust scanning device enabling problem-free handling without adversely affecting the highly accurate correction processes applied at the scanner head.

The advantage of another embodiment is that light reflections and shadowing which might otherwise be caused by a rough paper surface are safely prevented.

In an advantageous embodiment the scanned images are reproduced to a high degree of accuracy in the final document, enabling printed characters, for example, to be clearly distinguished. Furthermore, by evaluating the refracted light, no light reflections are produced and the visual copy of the scanned document obtained is true and highly accurate without any optical distortions to the image.

In accordance with another embodiment, high quality scanning results can be produced constantly over a relatively long period of time.

Other advantageous features for producing a true copy of the originally scanned document without distortions are set discussed below.

Also of advantage is another embodiment which enables friction-free insertion of the document to be scanned in the scanning region and, in spite of slightly varying thicknesses of the document, nevertheless ensures optimum contact between the scanner head and the document, which is vital to highly accurate, distortion-free scanning.

A further embodiment incorporates an automatic forward-feed of the document along the entire feed path provided inside the reading unit 1.

An advantageous embodiment offers a simple means of providing uniform image data detection and it is no longer necessary for the user of the reading unit to align the document, such positioning often not being performed satisfactorily by the user in many cases. Moreover, the reading unit 1 offers the user a noticeable gain in comfort enabling documents to be fed in without problems.

The advantage of a further embodiment is that if the document shifts transversely to the usual feed and guide direction, the document can not become torn or crumpled and the alignment process will be performed fully automatically.

A further embodiment is of advantage since any remains of paper or particles of dust that have become stuck can be cleared from the scanner head without the reading unit having to be subjected to long maintenance times.

Another embodiment has an advantage in that the quantity of information to be detected can be simultaneously reduced.

Also of advantage is an embodiment which allows information that is relevant to the user of the reading unit 1 to be permanently incorporated in the processed document. This information is preferably incorporated in plain text and can be used as a scanning report or as confirmation of the selection made.

Finally, an embodiment has an advantage in that the reading unit can be used by general users in particular. Irrespective of this, the reading unit can also be used with equipment made available for public use and accordingly is very easy to use offering a high degree of fault-free operating reliability.

The invention will be described in more detail below with reference to the embodiments illustrated in the drawings.

Of these:

FIG. 5 is a very simplified, schematic illustration of a section of the reading unit in the scanner region, seen from a side view.

Figure 1:
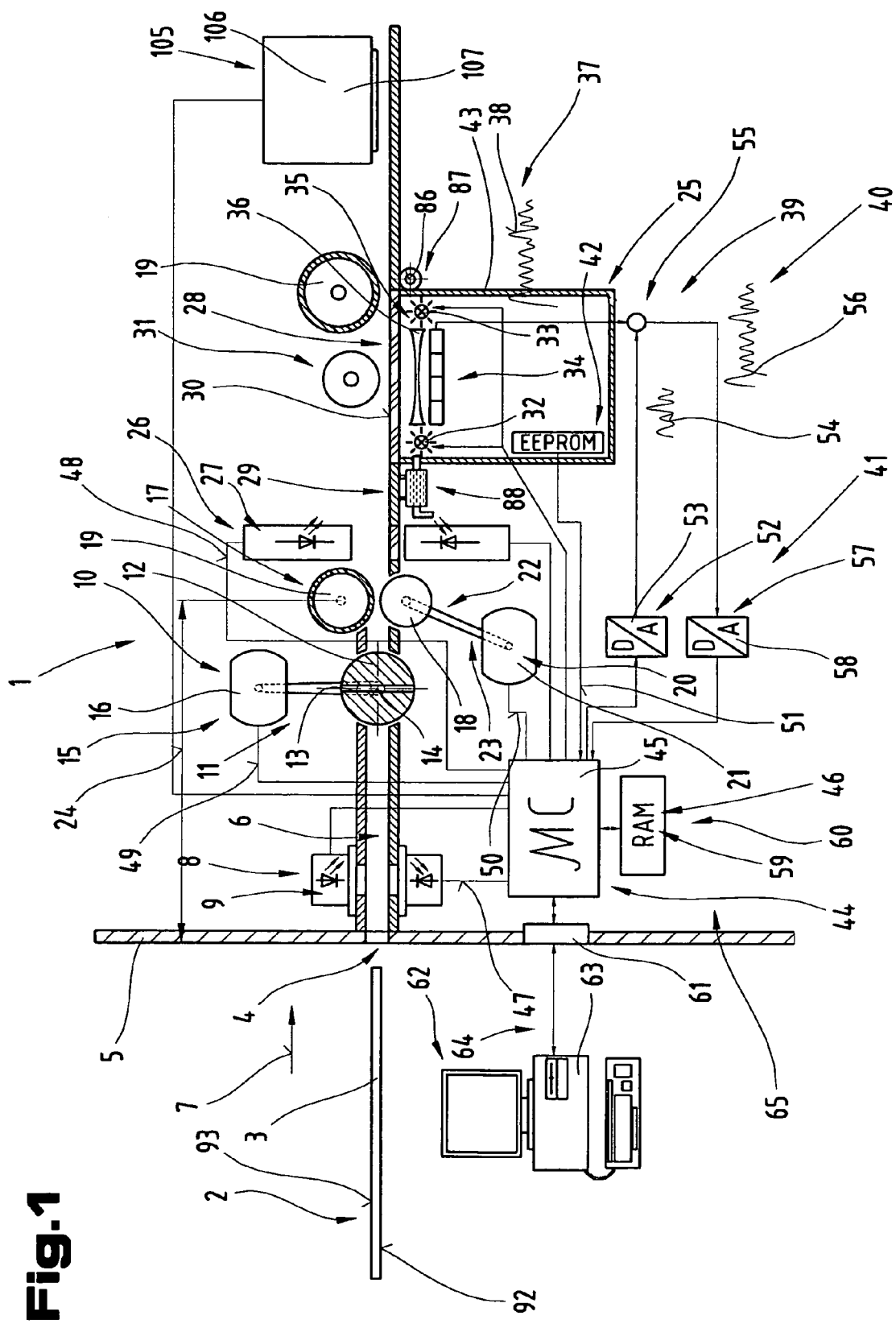
FIG. 1 is a very simplified, schematic operating and block diagram of the main structure of the reading unit proposed by the invention.

Firstly, it should be pointed out that the same parts are denoted by the same reference numbers and same component names in the different embodiments described and the disclosures made throughout the description can be transposed in terms of meaning to same parts bearing the same reference numbers and same component names. Similarly, the positions specified in the description, e.g. top, bottom, side, etc., may refer to the drawing actually being described and may be transposed in terms of meaning to the new position when a different position is being described. Furthermore, the individual features or combinations of characterising features illustrated and described in relation to different examples of embodiments may be construed as independent solutions of the invention or proposed by the invention.

FIG. 1 is a very simplified block diagram of a reading unit 1 proposed by the invention and incorporating the components proposed by the invention, for detecting optical images and graphics on documents 2 and for converting same into electrical signals for additional electronic processing of the detected image data. By documents 2 are meant forms 3, in particular payment slips such as used in the banking system or betting receipts such as used in the lottery system as well as any other printed papers bearing printed characters and other characters and symbols on individual sheets of paper.

A form 3, in particular a payment or betting slip, provided with a view to applying appropriate electronic processing to the data and information contained on the form 3, may be fed into the optoelectric reading unit 1 by any users via a feed orifice 4, the dimensions of which in cross section substantially correspond to the cross section dimensions of the form 3 to be scanned. The feed orifice 4 is preferably provided in a housing component 5 of a bank or lottery terminal. The form 3 manually inserted by the respective user via the feed orifice 4 is guided along its entire feed path, relative to the feed direction adjoining the feed orifice 4, and inside the entire reading unit 1, closed off from the exterior and protected to prevent access to the reading unit 1, by means of a guide mechanism 6.

To this end, the guide mechanism 6 may comprise guide rails and guide rollers and pressure rollers for the form 3, which essentially determine the feed path and feed direction of the document 2.

Arranged after the feed orifice 4 relative to a guide direction—arrow 7—is at least one detection device 8 for detecting objects inserted in the feed orifice 4. The detection device 8 preferably consists of at least one infra-red light sensor 9, which reliably detects a deliberately inserted paper form 3 to be processed. Optionally, the detection device 8 may also consist of mechanical switching elements or alternatively capacitive detection elements, whereby the form 3 depicts the dielectrics of a capacitor plate arrangement or causes a change therein.

Arranged after the detection device 8 in the feed and guide direction—arrow 7—is a lock and release device 10—in particular a shutter 11—which allows or prevents further insertion or deeper penetration of objects in the reading unit 1.

The lock and release device 10 is controlled directly or indirectly by the detection device 8 and, depending on the result of the detection process performed by the detection device 8, releases the guide mechanism 6 or alternatively the lock and release device 10 locks the guide mechanism 6 in order to prevent an inappropriate object from penetrating the reading unit 1.

The detection device 8 is specifically designed to detect inserted objects and only when objects made from paper with typical characters are inserted will the lock and release device 10, in particular the shutter 11, release the document 2 for unhindered continued feed-through. Depending in particular on the light intensity, i.e. depending on the light intensity transferred through the form 3 onto the second flat face thereof, the detection device 8, preferably provided as an infra-red light sensor 9, issues a signal accordingly and immediately emits a release or lock signal for the shutter 11.

This prevents inappropriate foreign objects which might have been deliberately inserted by vandals, as well as metal objects and plates, for example, from gaining access to the interior of the reading unit 1, thereby preventing damage or medium-term failure of the reading unit 1.

The lock and release device 10 is preferably designed as a rotation-symmetrical shaft 12 with a preferably circular cross section, having at least one slit-shaped orifice 13, the dimensions of which in cross section correspond at least to the cross section dimensions of the form 3.

The shaft 12 extends transversely across the guide mechanism 6 and across the guide path for the form 3 and is mounted so as to rotate about an axis 14 running transversely to the feed and guide direction—arrow 7—of the form 3. Mounted in this manner, a drive device 15, in particular an electric motor 16, co-operates with the shaft 12, the shaft 12 being driven in rotation when power is applied. The drive device 15 can be activated in such a way that the orifice 13 is aligned with the guide mechanism 6 and therefore provides an essentially stepless continuation of the guide path for the form 3. In addition, the lock and release device 10 can be displaced by the drive device 15 into positions of rotation angles in which the orifice 13 extends at an angle to the plane of the guide mechanism 6 and therefore interrupts or closes off the guide mechanism 6 for the form 3 so that the form 3 is prevented from being inserted in the feed and guide direction 7—arrow 7—beyond the lock and release device 10.

Clearly, instead of a rotary-action lock and release device 10, it would also be possible to use a lock and release device 10 which is displaced in translation, for example a plate-type slide or locking pin to lock and release the guide mechanism 6.

Provided the document 2 or form is recognised by the detection device 8 as being a legitimate object, the lock and release device is shifted into the release position and the user can insert the form 3 deeper in the reading unit 1.

Arranged after the lock and release device 10 in the feed and guide direction—arrow 7—of the form 3 is at least one electric motor-driven conveyor device 17 to convey and carry the form 3 for the rest of its travel inside the reading unit 1. This conveyor device 17, by means of which the form 3 is electrically driven by motor inside the reading unit 1, may have drive and/or conveyor rollers 18, 19 as well as pressure, guide and/or counter-pressure rollers or rolls. Furthermore, the conveyor device 17 may have feed belts or conveyor belts which ensure that the form 3 is fed along friction-free, optionally across several guide rollers inside the reading unit 1. By preference, the drive rollers 18 and/or the conveyor rollers 19 of the conveyor device 17 have a high friction coefficient relative to the paper of which the form 3 is made, at least on the surface regions which come into contact with the form 3, so that a good friction-lock contact is produced between the skin regions of the drive and conveyor rollers 18, 19 and the form 3. In order to increase the friction contact with the form 3 to be conveyed, the drive and/or conveyor rollers 18, 19 may be provided with layers of a substance such as rubber or plastics, for example, which adhere well to paper, in order to be able to transmit relatively high driving forces to the form 3.

As soon as the form 3 has been picked up by the first drive and conveyor rollers 18, 19 of the conveyor device 17, the form 3 is then automatically fed through the reading unit 1 without the need for the user of the reading unit 1 to exert any force. The drive rollers 18 of the conveyor device 17 are in rotary contact with at least one drive device 20, in particular with at least one electric motor 21. The rotary movement may also be transmitted from the drive device 20 to the drive rollers 18 using intermediately connected conversion devices 22, in particular gear units 23. The conversion devices 22 may consist of gear drives, friction wheel drives and/or belt drives and simultaneously change the speed of the drive rollers 18 so as to produce a specific feed rate of the form 3 accordingly.

A longitudinal extension of the form 3 relative to the guide direction—arrow 7—is longer than a distance 24, also relative to the guide direction—arrow 7—between the external end of the feed orifice 4 and a bottom or top dead centre on the skin surface of the first drive or conveyor roller 18, 19. As a result, the form 3 can be reliably inserted in the reading unit 1 by the user as far as the pick-up region of the conveyor device 17 and is then automatically drawn into the reading unit 1.

As soon as the form 3 is out of access range of the user, the lock and release device 10 or the shutter 11 can be closed again.

The form 3 is then drawn completely into the reading unit 1 by the conveyor device 17.

In conjunction with the conveyor device 17 and due to electrical power applied to the drive device 15, the form 3 is then fed on to a scanner device 25 of the reading unit 1. Another detection device 26 is preferably provided before the actual scanner device 25 relative to the direction in which the form 3 is being conveyed, comprising in particular at least one infra-red light sensor 27. The detection device 26 is set up to detect the form 3 conveyed by the conveyor device 17. As soon as the form 3 is picked up or detected by the detection device 26, the scanner device 25 is activated. The detection device 26 is therefore used to activate the scanner device 25 whenever a form 3 to be detected approaches the scanning region.

By preference, the detection devices 8, 26 are provided in the form of light-emitting and light-receiving units having optical prisms to deflect the light. The light-emitting and light-receiving units are jointly assigned to one of the two flat faces of the form 3 whilst the optical prism for deflecting the light beam is assigned to the other flat face of the form 3, so that the light-emitting and light-receiving point are assigned to one of the two sides of the form 3.

The scanner device 25 comprises a contact scanner 28, which detects the images contained on the form 3, such as printed characters and graphic symbols such as crosses, and converts these into corresponding electric signals. The contact scanner 28 has at least one light-transmitting or transparent surface region 29, which forms a bottom or alternatively top contact surface 30 for the form 3 as it is fed past the scanner device 25. The drive and/or conveyor rollers 18, 19 of the conveyor device 17 press the form 3 against the contact surface 30 so that it is placed in contact with the contact surface 30 across the entire flat region thereof. The drive and conveyor rollers 18, 19 therefore form a pressing device 31 in the scanning region, which places the entire surface of the form 3 against the contact surface 30, thereby preventing any waving which might otherwise occur in the form 3 across the scanning region and flattening out any deformations in the form 3. The transparent surface region 29 of the scanner device 25 may be formed by a light-transmitting or transparent element such as a plate of glass or plastics, for example.

The scanner device 25 also has several light sources 32, 33, which illuminate the form 3 to be optically scanned. The light sources 32, 33 are preferably provided as light-emitting diodes (LED), but may also be homogeneously illuminated gas discharge lamps or, as is the case, glow lamps.

The light sources 32, 33 are preferably assigned to the flat face of the form 3 containing the information to be scanned or printed and irradiate their light at least in a direction onto this flat face of the form 3. In particular, the flat face of the form 3 facing the contact surface 30 is illuminated with the light irradiated from the light sources 32, 33.

The scanner device 25 or contact scanner 28 also has an optoelectric transducer 34 consisting of a plurality of optoelectric elements which convert the light impacting on the surface thereof into corresponding electrical signals. The optoelectric transducer 34 consists of a plurality of linear or matrix-design optoelectric elements arranged one after the other, the size thereof and the distance by which they are spaced apart from one another determining the degree of graphic resolution of the scanning zone. The optoelectric transducer 34 detects at least a part of the length running transversely to the feed direction of the form 3. In other words, the optoelectric transducer 34 with the plurality of optoelectric elements extends at least across a part region of the flat face of the form 3 so that the information or data contained in the respective region of the form 3 can be scanned reliably and without contact.

By preference, the optoelectric transducer 34 is provided as a CCD (charge coupled device), in which the individual optoelectric elements are arranged in at least one row.

The entire extension of the form 3 running parallel with the feed direction can also be scanned by means of the relative displacement of the conveyor device 17 between the form 3 and the scanner device 25 or the contact scanner 28. Due to the extension of the optoelectric transducer 34 disposed transversely to the feed direction and as a result of the relative displacement between the form 3 and the scanner device 25, certain surface regions forming at least a part-region of one flat face of the form 3 can be scanned. The optoelectric transducer 34 therefore converts the light conditions prevailing at each optoelectric element, defined by the luminous intensity, light intensity and/or the colour of the light or similar, for example, into corresponding electric signals representing the respective light conditions.

The light irradiated from the light sources 32, 33 may therefore be in the form of white light or may also be light of any other colour. By preference, however, the light emitted by the light sources 32, 33 is coloured light so that coloured regions or colour reproductions on the form 3 corresponding to the colour of the irradiated light are faded out and not scanned. The light sources 32, 33 preferably emit red light so as not to scan or so as to fade out red characters or red graphics or symbols on the form 3, such as would appear on a payment slip for example, thereby reducing the information to be picked up and the resultant quantity of data. The colour corresponding to that emitted by the light sources 32, 33 therefore fades out symbols and characters on the form 3 which are of the same or a similar colour. For example, in the case of light sources 32, 33 emitting red, all surfaces of the form 3 with a red or yellow colour will be blanked and symbols on the form 3 in this type of colour will not be scanned. Optionally, light sources 32, 33 which irradiate in different wavelengths of light are provided, for example to irradiate red, green or blue light, so that the respective images printed on the form 3 in this colour can be faded out by this red, green or blue light colour.

The refracted light in the scanning region is preferably picked up by an optical lens system 35 and applied to the optoelectric transducer 34. This being the case, lens system 35 will include at least a gradient lens 36 or object-to-image lens which reproduces the refracted light on the optoelectric transducer 34 or the CCD. Accordingly, the refracted light in particular and not the reflected light from the light sources 32, 33 containing the light reflections will be applied to the optoelectric transducer 34, so as to obtain the most accurate images possible on the optoelectric transducer 34. The form 3 is scanned with a resolution more or less in the range of between 200 dpi to 400 dpi (dots per inch) and at least 256 grey tones. Clearly, it would also be possible to produce higher resolutions and/or more finely graded evaluations and colour detection.

The form 3 to be optically scanned is illuminated by the light sources 32, 33 from both sides in order to avoid any light reflections which might otherwise be caused by a rough paper surface. In terms of the direction in which the form 3 is conveyed, the light sources 32, 33 are therefore disposed before and after the optoelectric transducer 34 relative to the scanner device 25, which means that the optoelectric transducer 34 is arranged between at least two light sources 32, 33 and at least partially bounded by at least two light sources 32, 33 relative to the direction in which the form 3 is conveyed. Accordingly, the occurrence of shadows and light reflections which would otherwise distort the optical scanning process can be largely ruled out.

An electric image signal 37 representing the states of light acting on the optoelectric transducer 34 and representing changes in the light conditions occurring at the optoelectric transducer 34 is emitted by the optoelectric transducer 34 for the purpose of further electronic processing. The electric image signal 37 corresponding to the light conditions at the optoelectric transducer 34 is provided in particular in the form of an analogue signal 38 with a maximum amplitude in the region of a few volts.

Electric image signals 37 representing the images on the form 3 to be scanned are therefore applied to the output of the optoelectric transducer 34 in readiness for further electronic data processing. The scanning frequency of the optoelectric transducer 34 is therefore adjusted to the feed rate of the form 3 in the scanning region so that an adequate resolution of the flat face of the form 3 to be scanned can be obtained and any characters on the form 3 will be clearly distinguishable from one another.

Given that all components of the reading unit 1 are subject to certain tolerances which together affect the scanning result obtained by the scanner device 25 to differing degrees, the reading unit 1 is provided with a compensating device 39 which adapts the electric image signals 37 of the scanner device 25 accordingly.

To this end, the compensating device 39 has an electric compensating circuit 40 for the electric signals applied to the scanner device 25 and/or for the electric signals emitted by the scanner device 25.

Accordingly, depending on the tolerances of the respective components of the reading unit 1, the compensating device 39 is therefore able to compensate for the electric signals emitted to the actuators of the reading unit 1, such as the electric drive signals for the conveyor device 17, for example, or for the electric signals applied to the light sources 32, 33, in such a way that the tolerances inherent in these components are compensated for.

By preference, however, the electric signals and sensor signals emitted by the passive components of the reading unit 1, which also include the image signals 37 emitted by the optoelectric transducer 34, are corrected by means of the compensating device 39, in particular by means of the electric compensating circuit 40, in such a way that the tolerances of both the active components and the passive components and sensor elements of the reading unit 1 are eliminated or rendered ineffective.

Since the tolerances of the components used are different for every individual reading unit 1 of the same type and structure used and since the electrical and electromechanical components and modules which make up the reading unit 1 exhibit a certain tolerance range, there is always a certain amount of individuality to be taken into account when considering one individual reading unit 1 as compared with a plurality of reading units 1. Tolerances may occur, for example, in the light sensitivity of the optoelectric transducer 34 or the CCD chip, in the light sources 32, 33 and therefore in the illumination of the form 3 as well as in the mechanical structure of the reading unit, such as in the conveyor device 17, for example, all of which together would affect the scanning result if no compensating device 39 were provided.

The compensating device 39 and the compensating circuit 40 for linearizing the electric signals emitted by the scanner device 25, in particular for linearizing the analogue signal 38 representing the image data, operate by means of a programmable linearizer chip 41 of the compensating circuit 40. This individually programmable linearizer chip 41 may be provided in the form of standard hardware modules sold on the market, such as a CCD processor, for example. The compensating device 39 and the linearizer chip 41 are tested once during the production process prior to final testing of the reading unit 1 and specifically calibrated to each reading unit 1. In order to initialise the reading unit 1 and the scanner device 25, the respective corrective data is determined for the specific structure by a one-off test during the production process of the reading unit 1. The individual corrective data for an actual specific reading unit 1 or scanner device 25 can be determined by feeding in a form 3 with test and reference patterns. The corrective values may also be determined by conducting specific measurements on the individual components, for example on the optoelectric transducer 34 in relation to specific operating states or for example by optically sampling the scanning region without the presence of a document 2.

This corrective data specifically tested for the particular scanner device 25 or the particular reading unit 1 can be stored in a separate memory device 42. The memory device 42 is preferably provided in the form of a non-volatile read memory, such as an EPROM or an EEPROM memory, for example. The memory device 42 therefore co-operates directly with the scanner device 25 and the optoelectric transducer 34 with the associated light sources 32, 33 and lens system 35. The memory device 42 with the individual sets of corrective data therefore forms a compact unit with the actual scanner device 25 and a scanning and storage module 43 provided with defined interfaces. By preference, the memory device 42 with the corrective data is disposed on a printed circuit board of the scanning head and therefore co-operates directly with the component generating the image data from the form 3. As a result, when the scanner device 25 in the reading unit 1 is replaced, no unsuitable corrective data can be used because the scanning and storage module 43 incorporating the predefined interfaces to the peripheral equipment can be readily replaced along with the non-volatile memory device 42 for the individual corrective data sets for the scanned image pixels.

In order to control the individual sequences and/or to evaluate the image data from the form 3 produced by means of the scanner device 25, the reading unit 1 is provided with a control and/or evaluation device 44. The central control and/or evaluation device 44 of the reading unit 1 preferably consists of components of the type used in digital technology and include, for example, at least one micro-controller 45 and/or timing modules and/or driver modules and/or signal converter devices and/or other memory devices 46 for storing the programme to be run by the micro-controller 45 and/or to store intermediate results and computation results or other data. The other memory device 46 may also be used for intermediate storage of the corrective data which is not permanently stored by the non-volatile memory device 42. In particular, the corrective data at start-up and on initialisation of the reading unit 1 is transferred from the first memory device 42 into the other memory device 46, to which access time is comparably fast, so that the requisite corrective data is available to the compensating device 39 without delay. The corrective data determined individually for each reading unit 1 and permanently stored in the first memory device 42 is manipulated by the control and/or evaluation unit 44 every time the reading unit 1 is started and transferred serially into the other memory device 46, which is preferably provided in the form of RAM memory modules. The corrective data transferred to the other memory device 46 with each power-up may be accessed by the compensating circuit 40 and by the linearizer chip 41 significantly more quickly, particularly in parallel.

The control and/or evaluation device 44 is conductively connected to at least some of the active and passive components of the reading unit 1. Accordingly, the control and/or evaluation device 44 is conductively connected by means of at least one line 47, 48 to each of the detection devices 8, 26 and by means of at least one line 49, 50 respectively to the lock and release device 10 as well as to the drive device 20, so as to be able to either receive the electric signals emitted by these elements or supply the various components with corresponding electric signals.

Similarly, the memory device 42 with the corrective data for compensating the tolerances of the reading unit 1 is connected by means of at least one line 51 to the control and/or evaluation device 44 in order to be able to read the corrective data from the memory device 42. The corrective data is stored in the memory device 42 in digital form and can be read by means of the control and/or evaluation device 44, in particular by the micro-controller 45, and then written to the other memory device 46. The digital corrective data read from the memory device 42 and from the other memory device may be further processed in the control and/or evaluation device 44 as required and applied to a converter device 52, in particular a digital-to-analogue converter 53. At the output end, the converter device 52 generates a corrective signal 54 from the digital corrective data applied to it, in particular in analogue form, which is overlaid with the analogue signal 38 emitted by the scanner device 25, made available to the optoelectric transducer 34, and corresponds to the images on the form 3. The analogue corrective signal 54 representing the corrective data is overlaid with the analogue image signal 37 of the optoelectric transducer at an overlaying point 55, at which the corrective signal 54 is brought together with the image signal 37.

Overlaying the corrective signal 54 with the analogue signal 38 representing the image data therefore produces a corrected image signal 56, which fully corresponds to the actual images on the form 3. This corrected image signal 56 is an analogue signal, which is then applied to another converter device 57, which will be provided in particular as an analogue-to-digital converter 58 and which converts the corrected analogue image signal 56 into corrected digital image data.

The control and/or evaluation device 44 is designed to pick up this digitised, corrected image data and store it in an intermediate storage 59 assigned to the control and/or evaluation device 44 This intermediate storage 59 is specifically provided as a shift register 60, which is capable of picking up at least the image data of one scanned line of the document 2. This shift register 60 or FIFO storage (first in first out) is preferably connected to the control and/or evaluation device 44 of the reading unit 1 so that the latter is made ready for additional processing or for another transfer.

Prepared by the control and/or evaluation unit 44 of the reading unit 1, which may also be provided as a microprocessor, the image data can be transferred via an interface 61 to a higher-level computer 62, in particular a personal computer 63. The higher-level computer 62 process the data read by the reading unit 1 and allows it to flow into an open communications network such as a data network in the banking system, for example.

Optionally, the computer 62 may run an OCR programme, which converts the graphical image data into electronically processed text data or text files.

The interface 61 between the reading unit 1 and the higher-level computer 62, e.g. a bank terminal, is designed as a disconnection and connection point of a bus system 64 between the reading unit 1 and the computer 62. Any bus system known from the prior art as a means of transferring data may be used for the bus system 64. By preference, however, a standard Centronics parallel interface or alternatively a USB interface (universal serial bus) is used to transfer data between the higher-level computer 62 and the optoelectric reading unit 1.

The light emitted by the detection devices 8, 26 is preferably monitored by the control and/or evaluation unit 44. If the control and/or evaluation device 44 detects a change in the light intensity, the electric current applied to the detection devices is adapted accordingly so that any occurrence of ageing and/or any light soiling can be largely compensated for and detection accuracy largely assured. If the re-adjustment values shift outside specific boundaries, the control and/or evaluation device 44 will preferably issue a message to the effect that the detection devices 8, 26 need cleaning and servicing.

Figure 2:
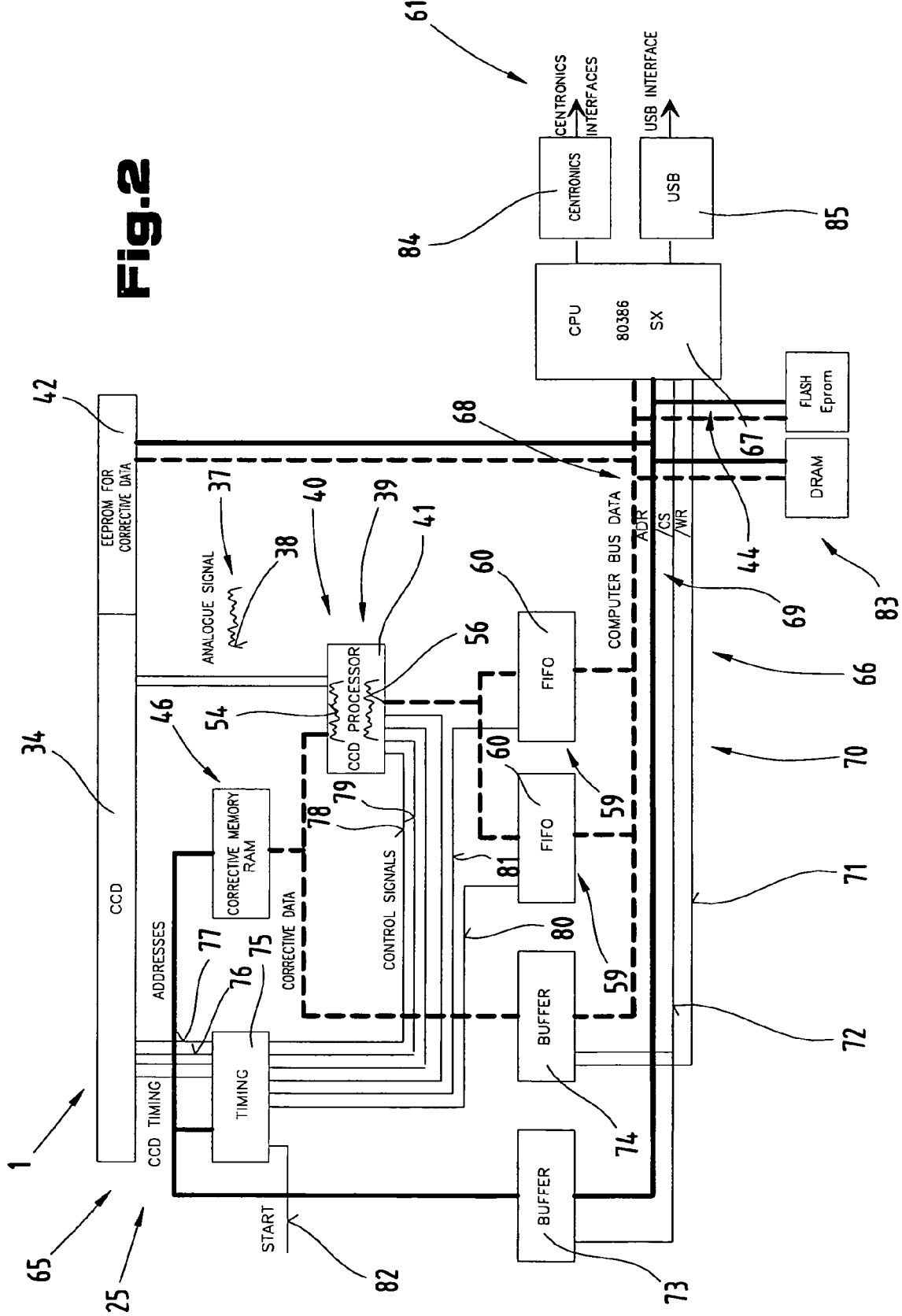
FIG. 2 is a block diagram of the most important of the electronic components integrated in the reading unit to illustrate how the individual groups of components co-operate with and are connected to one another.

FIG. 2 is a very simplified block diagram of the main components of the electronic system used in the reading unit 1 or a set of scanner electronics 65 for the reading unit 1. The scanner electronics 65 include the compensating device 39, the optoelectric transducer 34, the memory device 42, 46 for the corrective values of the scanner device 25 and the intermediate storage 59 and shift register 60, which co-operate with a computer bus 66 of the control and/or evaluation device 44 of the reading unit 1. The control and/or evaluation device 44 of the scanner electronics 65 is provided in particular as a microprocessor 67, which is able to transfer and receive data in digital form across the computer bus 66. The computer bus 66 comprises, in a known manner, a data bus 68, an address bus 69 or alternatively a combined address/data bus.

The data bus 68 and address bus 69 have several lines in order to be able to transfer several bits of a data word simultaneously. The computer bus 66 also has a control bus 70 with several control lines, e.g. a write/read line 71 and a selector line 72 (chip select) for selecting specific component groups, in particular for specifically selecting particular memory modules.

As may also be seen from FIG. 2, the compensating device 39 has a CCD processor in the form of a linearizer chip 41. This linearizer chip 41 or CCD processor is connected to the optoelectric transducer 34, in particular to the CCD element, in order to be able to process image signals 37 emitted therefrom in the form of analogue signals. The linearizer chip 41 is also conductively connected via the data bus 68 to the other memory device 46 containing the stored corrective values for compensating the tolerances of the reading unit 1 to enable the appropriate corrective values to be read rapidly. Moreover, the first, non-volatile memory device 42 switches to the data bus 68 in order to be able to transfer the permanently stored corrective data controlled by the control and/or evaluation device 44 into the other memory device 46. The linearizer chip 41 has direct access to the memory device 46, which means that relatively fast data transfer rates can be achieved.

The compensating device 39 or the linearizer chip 41 overlays the incoming image signal 37 with a corrective signal 54 corresponding to the corrective values stored in the memory device 42. In particular, the linearizer chip 41 or CCD processor adjusts the signal values of the analogue signal 38 picked up from the individual scanned image pixels depending on the corrective values assigned to each individual scanned image pixel stored in the memory device 42, 46.

The compensating device 39 or linearizer chip 41 therefore stores a corrective value in the memory device 42 or 46 for each image dot and for each pixel of the form 3 to be scanned, which will be duly assigned to the individual signal values as the image signal 37 is read. The compensating device 39 or compensating circuit 40 sums the corrective values associated with the individual signal values of the image signal 37 to the respective image signal values, for example, or the compensating circuit 40 subtracts the corrective values from the individual signal values of the image signal 37. The image signals 37 emitted by the optoelectric transducer 34 are corrected by the compensating device 39 in real time, i.e. the data processed by the compensating device 39 is not placed in intermediate storage but is processed immediately and forwarded without delay.

In particular, the linearizer chip 41 sums the values acquired from the individual image pixels with the associated corrective values stored in the memory device 46 and therefore applies an offset adjustment. In addition, the linearizer chip 41 multiplies the values acquired from the individual image pixels by the associated corrective values stored in the memory device 46 and thereby scales the scanned image. Clearly, it would also be possible to apply the offset adjustment and scaling of the scanned image by mathematical subtractions and divisions of the scanning values from and with the corrective values by means of the compensating circuit 40.

The corrected analogue image signal 56 generated by the compensating device 39 is then digitised and applied to the data bus 68. In particular, the compensating device 39 or CCD processor transfers the corrected digital image data to the intermediate storage 59 or the shift registers 60. The control and/or evaluation device 44 or the micro-processor 67 of the reading unit 1 then reads the corrected image data applied to the shift registers 60 via the computer bus 66.

The scanner electronics 65 incorporate at least two shift registers 60, to which the corrected image data generated by the linearizer chip 41 is applied in cycles.

In addition, at least one electronic buffer memory 73, 74 is assigned each to the data bus 68 and the address bus 69 of the computer bus 66 to provide intermediate storage for addresses and data of the computer bus 66.

The buffer memories 73, 74 are used for intermediate storage of addresses and data transferred from the control and/or evaluation device 44 to the other components of the scanner electronics 65 or are used for intermediate storage of data and addresses from the respective components of the scanner electronics 65 during transfers to the control and/or evaluation device 44.

Accordingly, the data bus 68 provides a line connection between the control and/or evaluation device 44, the shift registers 60, the buffer memory 74, the memory devices 42, 46 and the linearizer chip 41. The address bus 69 provides a line connection for transferring addresses between the control and/or evaluation device 44, the buffer memory 73 providing intermediate storage for addresses, the memory devices 42, 46 for the corrective values and a sequence control device 75.

The sequence control device 75 controls the sequence timing of the scanner electronics 65 and to this end is connected by means of several control lines 76, 77 to the optoelectric transducer 34 and in addition by several control lines 78, 79 to the linearizer chip 41. The sequence control device 75 is also connected by at least one control line 80, 81 each to a respective shift register 60 so as to be able to control these in timed cycles.

The sequence control device 75 which takes over the timing of the scanner electronics 65 can be activated to launch the sequencing programme by means of at least one additional control line 82.

The control and/or evaluation device 44 for the scanner electronics 65 co-operating directly with the mechanical components of the reading unit 1 or mounted thereon is provided in particular by the microprocessor 67, which may be of the Intel 80386 SX type, for example. The software programme to be run by the microprocessor 67 is stored in a data memory 83 assigned thereto, which may be provided as Flash-EPROM memory modules for example, duly connected to the respective lines of the computer bus 66.

The data memory 83 assigned to the microprocessor 67 also has another electronic memory device for storage or intermediate storage of intermediate results of the microprocessor 67. This additional memory device of the data memory 83 is preferably provided in the form of a dynamic, volatile memory, in particular in the form of a DRAM, connected to the corresponding lines of the computer bus 66.

As mentioned above, the microprocessor 67 of the scanner electronics 65 is connected by means of at least one interface 61, which may be a Centronics or USB interface for example, to the higher-level computer 62 illustrated in FIG. 1, for example a bank terminal. Via this interface 61 and the converter devices 84, 85 co-operating therewith to convert the respective transfer protocol, image data scanned from the form 3 by the reading unit 1 can be transferred in electrical form to the higher-level computer 62—see FIG. 1—which will then take charge of any additional processing of this image data, using an OCR programme for example.

As may be seen in particular from FIG. 1, the scanner device 25 or the scan and memory module 43 with the predefined electrical interfaces to the components of the scanner electronics 65 is mounted so as to pivot about at least one pivot axis 86 as required. This pivot axis 86 of an articulated link arrangement 87 preferably runs transversely to the guide or feed direction—arrow 7—of the form 3 in the region of the scanner device 25 and substantially parallel with the preferably glazed contact surface 30 for the form 3 on the actual scanner device 25. Accordingly, the structural unit comprising at least the optoelectric transducer 34, the lens system 35, the light sources 32, 33 and the scanner head with the memory device 42 for the corrective data, can be pivoted about this pivot axis 86 as required, e.g. to clean the transparent cover plate of this unit when necessary. The scanner device 25 can be moved from a non-operating position illustrated in FIG. 1 into a pivoted position away therefrom by means of an adjusting and/or locking device 88. By means of this adjusting and/or locking device 88, which is preferably manually operated by the maintenance personnel servicing the reading unit 1, the pivoting movement of the scanner device 25 about the pivot axis 86 can be released or locked. The positioning and/or locking device 88 checks the scanner device 25 in the normal state so that the contact surface 30 for the form 3 runs substantially parallel with the guide mechanism 6 and with the guide path in the region of the scanner device 25 and forms a substantially stepless continuation thereof.

If the positioning and/or locking device 88, which may be designed as a locking lever or a bayonet closure, is switched into the release position by the maintenance personnel or owner responsible after removing any housing covers from the reading unit 1, the scanner device 25 can be pivoted about the pivot axis 86 as a unit together with the contact surface 30 onto the transparent cover plate into a position suitable for cleaning. By dropping the scanner device 25 as a unit down about this pivot axis 86, the transparent contact surface 30 for the form 3 is freely accessible, since it is moved away, preferably by duly provided pressing devices 31 or by rollers of the conveyor device 17, thereby allowing thorough cleaning due to the ready accessibility. Once the scanner device 25 has been cleaned or serviced, it can be swung back into the initial or non-operating position illustrated in FIG. 1, in which any forms 3 fed in can be scanned and in which the contact surface 30 is aligned substantially parallel with the flat face of the forms 3 fed in. In the initial or non-operating position, the locking means of the positioning and/or locking device 88 are preferably automatically operated so that the scanner device 25 is automatically locked when pivoted back into the initial position.

By contrast with the schematic diagram shown in FIG. 1, in order to prevent any dirt particles from building up on the transparent plate of the scanner device 25 as far as possible, the top flat face is preferably used for the intake of a form 3. In particular, the form 3 is fed along the transparent plate with the top flat face of the form against the contact surface 30 and is therefore in direct contact therewith. The pressing device 31, which is preferably provided as a drive roller 18 running transversely to the feed direction—arrow 7—of the form 3 in the scanner region, therefore co-operates with the bottom flat face of the form 3 and presses it as flat as possible against the contact surface 30 arranged above. The pivot axis or centre line of the pressing device 31 or pressure roller runs exactly parallel with the longitudinal extension of the optoelectric transducer 34 and exactly parallel with the plane of the contact surface 30.

Once the reading unit 1 is made accessible from the top, generally by removing the housing components, and the scanner device 25 with the transparent cover plate for the light sources 32, 33, the lens system 35 and the optoelectric transducer 34 can be pivoted about the pivot axis 86 by approximately 180 E, it is possible to see down into and inspect the cover plate. The contact surface 30 generally disposed on the bottom flat face of the cover plate can then be inspected by means of the articulated link arrangement 87 from above with a bird's eye view for cleaning purposes and moved into the original position for the scanning process, in which any paper remains or dust particles are largely prevented from building up on the contact surface 30.

Figure 3:
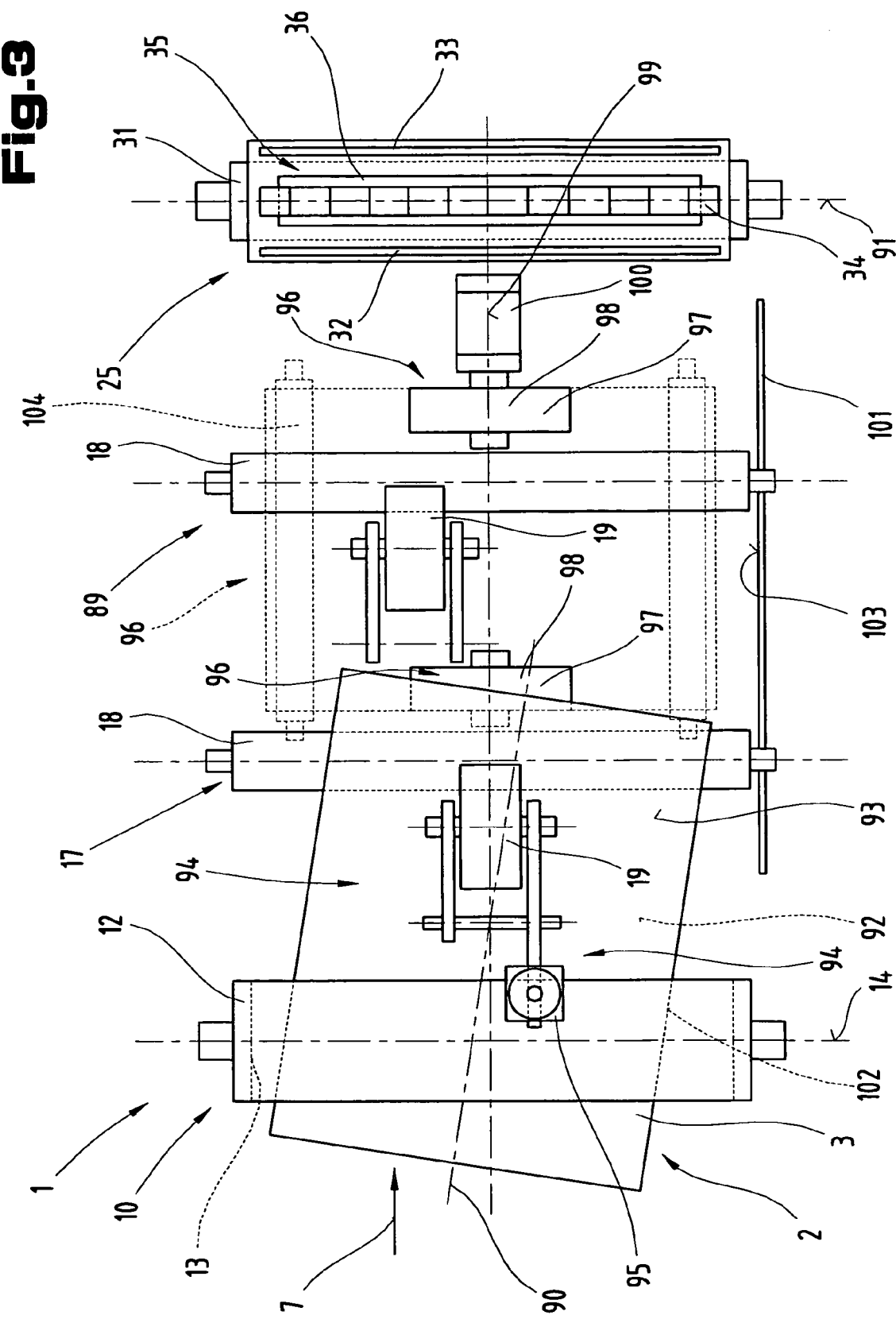
FIG. 3 is a very simplified, schematic illustration of one possible embodiment of the reading unit in the region of the scanner device, seen in a plan view.

As may be seen particularly clearly from FIG. 3, the reading unit 1 may also have an aligning device 89 for aligning any documents 2 or forms 3 which might be inserted in the reading unit 1 askew. Relative to the guide and feed direction—arrow 7—of the form 3, the aligning device 89 is preferably arranged before the scanner device 25 for optically scanning the form 3 to be read in. In particular, the aligning device 89 is arranged in the region between the lock and release device 10 and the scanner device 25 and forms 3 fed into the reading unit 1 askew by the user can be uniformly aligned to correct their orientation by the aligning device 89 before the actual scanning process. As a result of this aligning device 89, a centre axis 90 of the form 3 to be scanned is aligned substantially perpendicular to a longitudinal central axis 91 of the optoelectric transducer 34 and substantially perpendicular to the axis of rotation of the roller-type pressing device 31 in the region of the scanner device 25 before the form 3 is fed through the scanner device 25.

As illustrated in FIG. 3, a form 3 inserted by the user into the reading unit 1 at an angle to the actual guide and feed direction—arrow 7—is guided back into the scanner region by means of the released lock and release device 10. The form 3 is fed along by the electric motor-driven conveyor device 17. As soon as the form 3 reaches the region in which the aligning device 89 is actuated, the conveyor device 17 is controlled by the control and/or evaluation device 44 illustrated in FIG. 1. The form 3 is preferably conveyed with the co-operating action of the drive and conveyor rollers 18, 19 by a bottom and top flat face 92, 93 of the form 3. In order to feed the form 3 along, the drive and/or conveyor rollers 18, 19 of the conveyor device 17 therefore sit in contact with the bottom and the top flat face 92, 93 in friction contact. As soon as the form is fed into the operating region of the aligning device 89, the conveyor device 17 is halted and the drive and/or conveyor rollers 18, 19 are lifted away from the bottom or the top flat face 92, 93, in particular however from the top flat face 93, so that the friction contact of the rollers or rolls of the conveyor device 17 is removed from at least one flat face 92, 93 of the form 3. The friction contact between the form 3 and the conveying means of the conveyor device 17 is released due to a positioning device 94, by means of which the drive or conveyor rollers 18, 19 can be moved in a vertical direction away from the planes forming the flat faces 92, 93 of the form 3.

The positioning device 94 is electrically connected to the control and/or evaluation device 44 of the reading unit 1 and is controlled thereby. The displacement path of the drive or conveyor rollers 18, 19 in a direction perpendicular to the flat faces 92, 93 of the form 3 can be controlled by means of drive means 95 driven by an electric motor or electromagnetically, such as tension magnets, for example. The displacement path of the drive or conveyor rollers 18, 19 may be controlled by means of a pivot lever mounting—as illustrated in FIG. 3—or alternatively by devices mounted in translation, such as bearing pins of the rollers guided in vertical slide tracks, in which case the drive means 95 controlled by the control and/or evaluation unit 44 will initiate displacement of the positioning device 94.

Once at least some of the drive or conveyor rollers 18, 19 have been moved back from at least one flat face 92, 93 of the form 3 and the form 3 lies against the remaining drive or conveyor rollers 18, 19 essentially only by means of the corresponding force of gravity produced by the weight of the form 3 and is therefore no longer clamped thereby, the aligning device 89 is activated.

The aligning device 89 comprises at least one transverse conveyor device 96, which causes the form 3 to be displaced transversely to the usual guide and feed direction—arrow 7. To this end, this transverse conveyor 96 has transverse conveyor means 97, preferably provided in the form of transverse conveyor rollers 98 or transverse conveyor rolls, the axis of rotation 99 thereof running parallel with the usual guide and feed direction—arrow 7—of the form 3. In particular, the axes of rotation 99 of the transverse conveyor means 97 extend transversely to the axes of rotation of the drive or conveyor rollers 18, 19 of the conveyor device 17 and substantially parallel with the flat faces 92, 93 of the form 3 in a friction contact. The transverse conveyor means 97 of the transverse conveyor device 96 are in a friction contact with at least one flat face 92, 93 of the form 3. By preference, however, the transverse conveyor means 97 is in a friction contact with the bottom flat face 92 of the form 3.

By means of the drive means 100 co-operating with the transverse conveyor means 97 or transverse conveyor rollers 98, the latter can be controlled by the control and/or evaluation device 44 so as to be driven in rotation, thereby moving the form 3 transversely to the usual guide and feed direction—arrow 7—onto a stop member 101. Accordingly, a strong friction contact is produced, preferably with the bottom flat face 92 of the form 3, so that the form 3 is reliably conveyed in a transverse direction. The transverse conveyor device 96 is activated until a front edge 102 of the form 3 facing the stop member 101 lies largely end-to-end against a stop surface 103 of the strip-shaped stop member 101. As a result, the centre axis 90 of the form 3 runs largely perpendicular to the longitudinal central axis 91 of the optoelectric transducer 34, thereby producing a predefined alignment for the scanning procedure. Once the form 3 has been correctly aligned by the transverse conveyor device 96, the drive or conveyor rollers 18, 19 which were previously moved apart are preferably placed back in contact with the two flat faces 92, 93 of the form 3 by means of the positioning device 94, the transverse conveyor device 96 being deactivated beforehand. The conveyor device 17 is then reactivated and the form 3 runs through the activated scanner device 25 with the front edge 102 aligned parallel with the stop surface 103.

Instead of the transverse conveyor rollers 98 of the transverse conveyor device 96 described above, it would also be possible, as shown by broken lines, to provide a conveyor belt 104 placed in overall surface contact with at least one flat face 92, 93 of the form 3, thereby ensuring a sufficient friction contact value between the circulating conveyor means and the form 3.

Instead of the mechanical aligning device 89 in the reading unit 1, it would also be possible to allow the form 3 to run through the scanner device 25 askew and run a standard software programme to regenerate image data or to compensate for the crooked feed of the form 3 by means of software.

Figure 4:
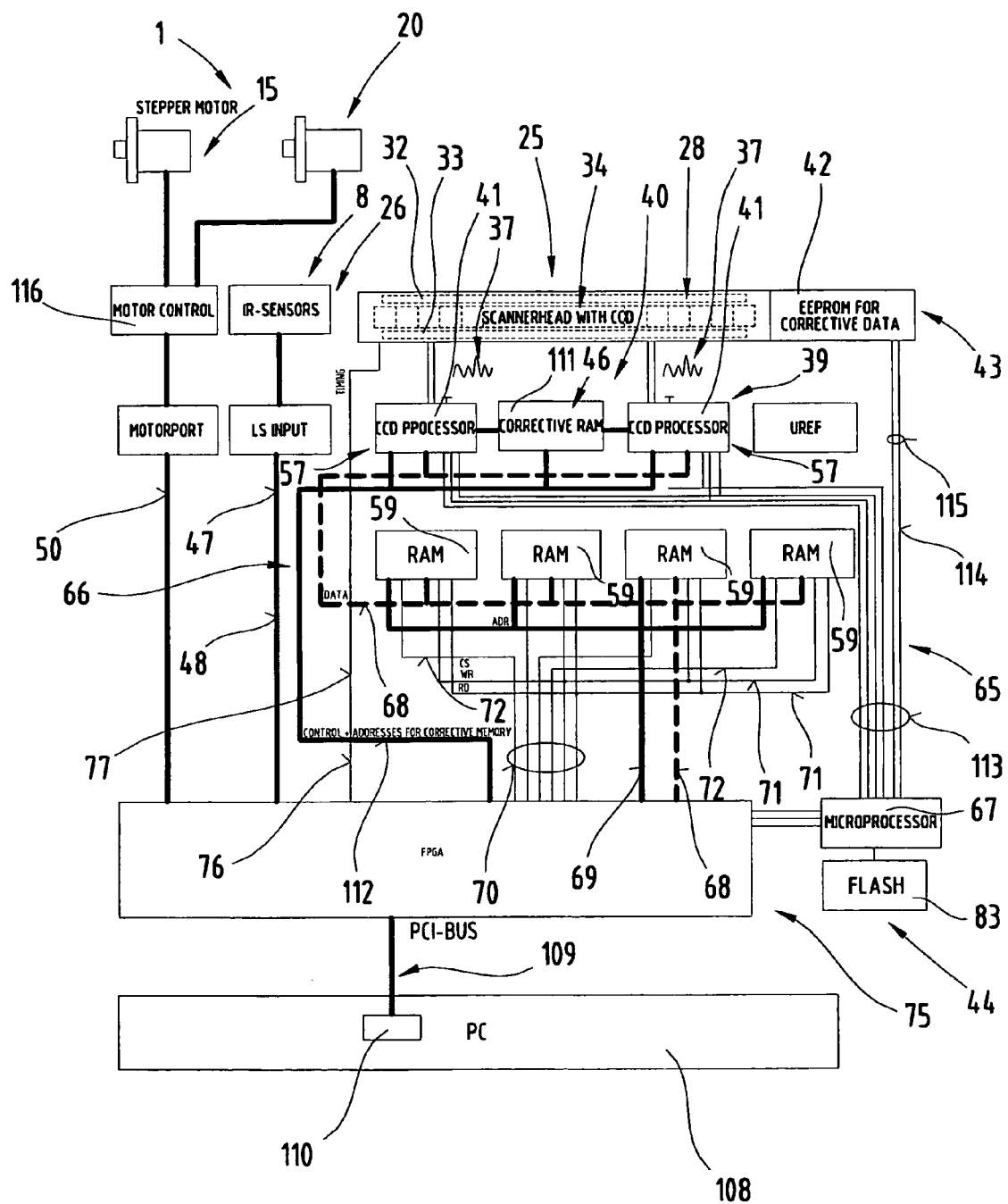
FIG. 4 is a very simplified, schematic illustration in the form of a block diagram, depicting another embodiment of the electronics integrated in the reading unit for directly transferring image data into a personal computer.

FIG. 4 illustrates another embodiment of the scanner electronics 65 for the reading unit 1, the same reference numbers being used for components already described above.

These scanner electronics 65 are specifically designed to permit fast transfer of the image data read from a document or form directly into the access region of a personal computer 108. In particular, the image data red from the form by means of these scanner electronics 65 is transferred via the PC bus 109 used in the personal computer 108 directly into a PC main memory 110 of the personal computer 108.

The personal computer 108 is set up to apply additional processing, evaluate, transfer and/or incorporate data present on the form in a regional data network, e.g. in a data network of the lottery system and/or to display image data generated by the reading unit 1. The basic electronic components of the scanner electronics 65, other than the scanning and memory module 43, are preferably disposed on a printed circuit board, which can be inserted in a free slot of the personal computer 108 so as to be in direct electrical contact with the PC bus 109. The PC bus 109 in the personal computer 108 is provided as a PCI bus in particular, by means of which the microprocessor of the personal computer 108 exchanges data with the peripheral components.

Here too, the scanner electronics 65 also have a compensating circuit 40 for correcting the image data supplied by the scanner device 25. The compensating circuit in this case has at least two linearizer chips 41, which process the analogue image signals 37 emitted by the scanner device 25 and optoelectric transducer 34. The two linearizer chips 41 are conductively connected to the additional memory device 46, provided in particular as a corrective data memory 111 made up of rapid-access RAM memory modules. This corrective data memory 111 assigned to the two linearizer chips 41 of the compensating device 39 acts as an intermediate storage of the linearizer chips 41 for corrective data from the first memory device 42 in the scanner head which has to be processed, provided in particular as EEPROM memory modules. The image data supplied by the scanner device 25 and optoelectric transducer 34 in this embodiment is therefore picked up in parallel by at least two linearizer chips 41 and additionally processed, the tolerances inherent in the reading unit 1 being eliminated or cancelled in particular. The control and/or evaluation device 44 of these scanner electronics 65 is provided by means of the microprocessor 67 in particular and by the sequence control device 75. The sequence control device 75 performing a central control function of the reading unit 1 is provided in particular in the form of a freely programmable gate arrangement or by at least one FPGA (Free Programmable Gate Array). The sequence control device 75 is therefore provided as a fixed programmable module, in which the corresponding sequence logic is stored and which controls the peripheral components of the reading unit 1 accordingly.

The sequence control device 75 is therefore also connected to the microprocessor 67 of the scanner electronics 65.

The computer bus 66 of the scanner electronics 65 again has at least one data bus 68, an address bus 69 and a control bus 70. The data bus 68 connects the data port of the linearizer chip 41 to the corresponding data inputs and outputs of the intermediate storage 59, which are provided in particular as RAM memory modules, and with the data port of the sequence control device 75. The address bus 69 connects the address port of the memory modules of the intermediate storage 59 to the address port of the sequence control device 75. The control bus 70, also running from the sequence control device 75, runs to the control inputs of every memory module of the intermediate storage 59 and in doing so has at least one write/read line 71, which switches the corresponding memory module to a write or read process and at least one selector line, but preferably an individual selector line 72 for each memory module, which switches the memory module to be controlled to active or non-active mode.

In addition, the scanner electronics 65 include at least one additional control and address bus 112, electrically connected to each of the linearizer chips 41 and to the corrective data memory 111 co-operating with the linearizer chips 41 and which also originates in the sequence control device 75. The control and address bus 112 may be designed as a combined control and address bus 112, i.e. the lines of the control and address bus 112 are used to transfer control and address data in delayed time. The control and address bus 112 may have separate respective lines for transferring control and address data. The address lines of the control and address bus 112 are preferably assigned to the corrective data memory 111 for the corrective data.

In addition, the two linearizer chips 41 are electrically connected via another control bus 113 to the microprocessor 67 of the control and/or evaluation unit 44. This control bus 113 has at least two control lines, which are used amongst other things to configure and initialise the linearizer chips 41.

Accordingly, the linearizer chips 41 are activated and/or configured and/or initialised and/or controlled firstly via the control and address bus 112 of the sequence control device 75 and secondly via the control bus 113 of the microprocessor 67.

The memory device 42 containing the corrective data for cancelling out tolerances of the components in the reading unit 1, in particular the corrective data for cancelling out the tolerances inherent in the scanner head, is electrically connected via at least one line 114, in particular via a data bus 115, to the microprocessor 67.

The microprocessor 67 is able to read the corrective data stored in the memory device 42 by means of this data bus 115 and transfer it to the compensating circuit 40, in particular to the other memory device 46 and also to the sequence control device 75. The first memory device 42 is directly assigned to the scanner device 25 and forms a largely independent module in conjunction therewith having predefined interfaces to the other components of the scanner electronics 65. The corrective data is read serially from the memory device 42, at least whenever the reading device 1 is powered up, and transferred to the other memory device 46 or to the corrective data memory 111, which provides more rapid, in particular parallel access for the linearizer chips 41 at relatively high data transfer rates.

At least one control line 76, 77 electrically connects the sequence control device 75 to the scanner device 25, primarily so as to be able to set and control the timing of the scanner device 25 to suit requirements accordingly.

Running from the sequence control device 75 programmed to run fixed sequences, the detection devices 8, 26 can be controlled and queried from at least one line 48. In addition, the drive device 15, 20 and every other drive device of the reading unit 1 that is driven by electric motor are electrically connected to the sequence control device 75 by at least one line 50. The drive devices 15, 20 are preferably provided in the form of stepper motors, a motor control device 116 being disposed upstream thereof.

A form to be scanned by the reading unit 1 is optically scanned by the scanner device 25, which is designed in the form of a contact scanner 28. The resultant image data generated is transferred to the compensating circuit 40 by means of electric signals in analogue form. The compensating circuit 40 or linearizer chips 41 read the image data in and compute out the tolerance-dependent variances of the reading unit 1 and scanner device 25. The corrected, analogue image signals are then converted by means of the linearizer chips 41 into digital data and temporarily memorised in the intermediate storages 59 in digital form on a PCI bus card of the personal computer 108.

Immediately a scanned line is detected across the relatively fast PC bus 109, in particular across the PCI bus of the personal computer 108, the corrected image data just read is transferred by the complex sequence control device 75 directly into the PC main memory 110 of the personal computer 108. The data transfer rate is in excess of 10 MB/s. Consequently, the scanning process and optical character recognition (OCR) or OMR (Optical Mark Recognition) can be performed largely simultaneously, therefore bringing a considerable saving in time as compared with a sequential solution.

The corrective data in the memory device 42 or 46 primarily takes account of the different control-dependent sensitivities of the individual scanning elements of the optoelectric transducer 34. When the reading unit 1 is initialised for the first time, this corrective data is determined on the basis of actual value measurements compared with desired values and permanently stored in the memory device 42 so that these tolerances can be subsequently cancelled out by the linearizer chips 41 as accurately as possible.

As may be seen particularly clearly from FIG. 1, the reading unit 1 may also have an output device 105 to output specific data. The output device 105 is preferably configured to retrieve data from the document 2 or form 3 and may be provided in the form of a printer unit 106 and/or a stamping unit 107 for endorsing the form 3 so as to apply bank or lottery-related data to the form 3 as permanently as possible. The text applied or the mark applied can subsequently be read by any person without additional aids. The plain text endorsement on the form 3 applied by the output device 105 may be printed by a line printer in the form of a dot matrix, ink jet and/or laser printer. The printer unit 106 or the stamping unit 107 is therefore electrically connected to the control and/or evaluation unit 44 of the reading unit 1 and/or to the higher-level computer 62 in order to be able to apply the received data to the form 3 as far as possible in plain text.

By preference, the output device 105 is arranged before the scanner device 25 in the usual guide and feed direction—arrow 7. As illustrated in FIG. 1, however, it would also be possible to arrange the output device 105 after the scanner device 25 relative to the usual guide and feed direction—arrow 7.

The form to be printed 3 is also fed along by means of the conveyor device 17, which enables a relative movement between the form 3 and the output device 105. Following the optical scanning process performed on the form 3 by the scanner device 25 and following the printing process of the form 3, the latter is fed out by the conveyor device 17 either into a catchment tray or a stacker or alternatively may be dispensed directly to the respective user of the reading unit 1. In order to dispense the form 3 to the owner of the form 3 or to the user of the reading unit 1, the form 3 is preferably conveyed by means of the conveyor device 17 in the direction opposite the usual guide and feed direction to the feed orifice 4, where it is placed in readiness for removal. Clearly, it would also be possible to return the form 3 using a guide roller in the guide mechanism 6 and dispense the form at a separate output point if required.

Clearly, it would also be possible to design the scanner device 25 to detect coloured data. To this end, either several scanner devices 25 could be used to detect each of the different colours, arranged one after the other relative to the usual feed and guide direction—arrow 7—or a combined scanner device 25 could be provided, which would be designed to detect at least the three basic colours, red, green and blue.

Another option is to provide an optoelectric transducer 34 or CCD chip with individually selectable red, green and blue illumination and run individual scanning procedures for differently coloured illumination in sequence, picking up the respective colour data sets from this one scanner device 25 one after the other. This being the case, a conveyor device 17 with a switchable or bidirectional conveyance direction will allow the form 3 to be fed through the scanner device 25 in multiple passes.

It would also be possible to provide an optoelectric transducer 34 or CCD chip to which lighting means or light sources 32, 33 for irradiating white light can be assigned and which are designed to detect coloured information directly, which would result in relatively short throughput and detection times.

FIG. 5 is a detailed illustration of the reading unit 1 proposed by the invention, the same reference numbers being used for components already described above.

FIG. 5 specifically illustrates a form 3 disposed in the immediate scanning region of the scanner device 25. Relative to the usual guide and feed direction—along arrow 7—the form 3 is located immediately in front of a scanner head 117 of the scanner device 25.

The form 3 can be displaced by means of the conveyor device 17 relative to the scanner device 25. By preference, the conveyor device 17 feeds the form 3 relative to the scanner head 117 which is mounted so as to remain stationary. Clearly, however, it would also be possible to displace the scanner head 117 or the scanner device 25 by means of the conveyor device 17 relative to a stationary form 3.

The conveyor device 17 preferably has electric motor-driven drive and/or conveyor rollers or rolls, which are in friction contact with a flat face 92, 93 of the form 3 to be scanned, ensuring a reliable forward feed. By preference, the drive and/or conveyor rolls or rollers 18, 19, with the exception of the pressing device 31, are provided as circular discs spaced at a distance apart from one another and arranged on a common axis of rotation so that only part regions of the form 3 are always in contact with the surface of the drive and/or conveyor rollers 18, 19. In particular, due to the design of the drive and/or conveyor rollers 18, 19 described above, there is contact with the form 3 only at specific distances running transversely to the feed direction—arrow 7—so as to avoid any folds as far as possible.

The scanner head 117 for optoelectrically scanning the form 3 is modular in nature, designed as a substantially independent unit with predefined interfaces to the peripheral units of the reading unit 1, in particular the scanner electronics 65. The connecting means between the scanner device 25 or the scanner head 117 and the above-mentioned peripheral electronic components are cables 118, in particular, such as ribbon cables for example.

The scanner device 25 or the scanner head 117 comprises in particular the light sources 32, 33, the lens system 35, the optoelectric transducer 34 and at least one scanner head printed circuit 119 with the memory device 42 for the corrective data. The above-mentioned electrical, optoelectric and optical components of the scanner device 25 are retained in a housing-type housing frame 120. In terms of cross section—as illustrated in FIG. 5—this housing frame 120 has a preferably substantially U-shaped cross section, the above-mentioned components being disposed in the space enclosed by the legs and the base plate. The interior of the essentially U-shaped housing frame 120 is closed off from its surroundings by means of a transparent cover plate 121 placed against the legs and preferably made from glass.

Relative to the guide and feed direction—indicated by arrow 7—of the document 2, the linear-shaped light sources 32, 33, preferably provided as LED strips, are arranged before and after the optoelectric transducer 34 so that the form 3 is illuminated on both sides relative to the optoelectric transducer 34, thereby avoiding any light reflections on the rough paper surface.

During the scanning process, the transparent cover plate 121 is in contact with the flat face 93 of the form to be scanned over as large a surface area as possible, virtually ruling out the formation of any air gaps between the transparent cover plate 121 and the top flat face 93. The centre axes of the optoelectric transducer 34, the lens system 35 and the rotation axis of the pressing device 31, which is provided as a drive roller in particular, therefore lie on a common vertical axis 122. This vertical axis 122 therefore forms an axis of symmetry of the optoelectric transducer 34 or the CCD chip, lens system 35 and pressing device 31. By preference, the two strip-shaped light sources 32, 33 are arranged symmetrically relative to this vertical axis 122. As already mentioned above, the pressing device 31 is preferably provided in the form of a driven roll or as one of the rollers of the conveyor device 17 and preferably has a flexible or elastically resilient skin region more or less across the entire width of the form 3, being made from a foam in particular.

The scanner device 25 and the scanner head 117 are also mounted in the reading unit 1 so as to be displaced in translation and/or in rotation by means of a bearing device 123. To this end, the bearing device 123 has an articulated and/or guide mechanism 124 which bears the scanner device 25 and the scanner head 117 so as to rotate and/or move in translation in the direction of the arrows 125 and 126.

The articulated and/or guide mechanism 124 enables the scanner head 117 to be displaced in a vertical direction relative to the guide mechanism 6 and to the guide path for the form 3 and to be pivoted about a pivot axis 127 running transversely to the feed direction and substantially parallel with the flat faces 92, 93. To this end, the housing frame 120 has at least one bearing pin 128 with a circular cross section, which is inserted in a longitudinal bore provided as a vertical guide 129. Accordingly, the scanner head 117 and housing frame 120 can be pivoted—in the direction of arrow 125— about the pivot axis 127 and simultaneously displaced in translation across the vertical guide 129—as indicated by the arrow 126. The pivot axis 127 of the bearing pin 128 and the longitudinal central axis of the longitudinal bore forming the vertical guide 129 therefore also lie on the vertical axis 122.

By preference, the bearing pin 121 is formed on the housing frame 120 and is housed in a vertical guide 129 provided in the mechanical parts of the reading unit 1. Clearly, it would also be possible to arrange the vertical guide 129 so that it co-operates with the housing frame 120 and provide the bearing pin 128 on the mechanical parts of the guide mechanism 6 and the reading unit 1.

A distance 130 between the contact surface or contact line for the form 3 on the pressing device 31 or the guide mechanism 6 and the contact surface 30 of the scanner head 117 on the top flat face 93 of the form 3 is the same as or slightly smaller than a standard thickness 131 of the forms 3 to be scanned. As a result, the scanner head 117 lies tightly against the top flat face 93 of the form 3 thereby ensuring an intimate contact with the form 3. Mounting the scanner head 117 so that it can rotate and/or be displaced in translation means that the form 3 can be fed smoothly underneath the scanner device 25 without any blockages or disruptions occurring as the form 3 is fed in.

In order to ensure that the form 3 can be run in and out of the scanning region smoothly, the scanner head 117 preferably has at least one inclined guide track 132. The guide tracks 132 may be provided on the housing frame 120 itself or by independent slide surfaces.

As may also be seen from FIG. 5, the scanner device 25 with the optoelectric transducer 34 preferably faces the top flat face 93 of the form 3 and the lighting means 32, 33 irradiate their light in the direction of this top flat face 93. The lighting means 32, 33, preferably comprising a plurality of light emitter diodes or one light emitter diode with a light diffuser above the scanning span, are preferably arranged respectively before and after the optoelectric transducer 34 relative to the standard guide and feed direction—arrow 7—of the form 3. As may also be seen, the light irradiated from the light sources 32, 33 and refracted by the flat face 93 of the form 3 is directed via the lens system 35, in particular across the gradient lens 36, onto the optoelectric transducer 34 with the individual optoelectric elements.

The detection device 26 for detecting a form 3 being fed into the scanner region may also be provided—as schematically illustrated—in the form of a reflecting light sensor. Furthermore, a detection device 133 may also be provided as a means of detecting a form 3 as it leaves the scanning region.

In order to be able to store the scanner head 117 safely in the mounting device 123, the centre of gravity 117 thereof preferably lies below the pivot axis 127 formed by the bearing pin 128. The scanner device 25 or the scanner head 117 is designed to be closed off to protect against dust by means of the housing frame 120 and the cover plate 121 but permeable to air moisture so that dirt is largely prevented from getting into the interior whilst at the same time preventing condensation problems.

For the sake of good order, it should be pointed out that in order to provide a clearer understanding of the structure of the reading unit and the scanner electronics, they and their component parts have been illustrated out of scale to a certain extent and/or on an enlarged scale and/or on a reduced scale and very much simplified.

LIST OF REFERENCE NUMBERS

| | List of reference numbers |
|---|---|
| 1 | Reading unit |
| 2 | Document |
| 3 | Form |
| 4 | Feed orifice |
| 5 | Housing component |
| 6 | Guide mechanism |
| 7 | Arrow |
| 8 | Detection device |
| 9 | Infra-red light sensor |
| 10 | Lock and release device |
| 11 | Shutter |
| 12 | Shaft |
| 13 | Orifice |
| 14 | Axis |
| 15 | Drive device |
| 16 | Electric motor |
| 17 | Conveyor device |
| 18 | Drive roller |
| 19 | Conveyor roller |
| 20 | Drive device |
| 21 | Electric motor |
| 22 | Converter device |
| 23 | Gear unit |
| 24 | Distance |
| 25 | Scanner device |
| 26 | Detection device |
| 27 | Infra-red light sensor |
| 28 | Contact scanner |
| 29 | Surface region |
| 30 | Contact surface |
| 31 | Pressing device |
| 32 | Light source |
| 33 | Light source |
| 34 | Transducer (optoelectric) |
| 35 | Lens system |
| 36 | Gradient lens |
| 37 | Image signal |
| 38 | Analogue signal |
| 39 | Compensating device |
| 40 | Compensating circuit |
| 41 | Linearizer chip |
| 42 | Memory device |
| 43 | Scanning and memory module |
| 44 | Control and/or evaluation device |
| 45 | Micro-controller |
| 46 | Memory device |
| 47 | Line |
| 48 | Line |
| 49 | Line |
| 50 | Line |
| 51 | Line |
| 52 | Converter device |
| 53 | Digital-to-analogue converter |
| 54 | Correction signal |
| 55 | Overlay point |
| 56 | Image signal |
| 57 | Converter device |
| 58 | Analogue-to-digital converter |
| 59 | Intermediate storage |
| 60 | Shift register |
| 61 | Interface |
| 62 | Computer |
| 63 | Personal computer |
| 64 | Bus system |
| 65 | Scanner electronics |
| 66 | Computer bus |
| 67 | Microprocessor |
| 68 | Data bus |
| 69 | Address bus |
| 70 | Control bus |
| 71 | Read/write line |
| 72 | Selector line |
| 73 | Buffer memory |
| 74 | Buffer memory |
| 75 | Sequence control device |
| 76 | Control line |
| 77 | Control line |
| 78 | Control line |
| 79 | Control line |
| 80 | Control line |
| 81 | Control line |
| 82 | Control line |
| 83 | Data memory |
| 84 | Converter device |
| 85 | Converter device |
| 86 | Pivot axis |
| 87 | Articulated link arrangement |
| 88 | Positioning and locking device |
| 89 | Aligning device |
| 90 | Centre axis |
| 91 | Longitudinal central axis |
| 92 | Flat face |
| 93 | Flat face |
| 94 | Positioning device |
| 95 | Drive means |
| 96 | Transverse conveyor device |
| 97 | Transverse conveyor means |
| 98 | Transverse conveyor roller |
| 99 | Axis of rotation |
| 100 | Drive means |
| 101 | Stop member |
| 102 | Front edge |
| 103 | Stop surface |
| 104 | Conveyor belt |
| 105 | Output device |
| 106 | Printer unit |
| 107 | Stamping unit |
| 108 | Personal computer |
| 109 | PC bus |

-continued

| List of reference numbers | |
|---|---|
| 110 | PC main memory |
| 111 | Corrective data memory |
| 112 | Control and address bus |
| 113 | Control bus |
| 114 | Line |
| 115 | Data bus |
| 116 | Motor control device |
| 117 | Scanner head |
| 118 | Cable |
| 119 | Scanner head printed board |
| 120 | Housing frame |
| 121 | Cover plate |
| 122 | Vertical axis |
| 123 | Bearing device |
| 124 | Articulated and/or guide mechanism |
| 125 | Arrow |
| 126 | Arrow |
| 127 | Pivot axis |
| 128 | Bearing pin |
| 129 | Vertical guide |
| 130 | Distance |
| 131 | Thickness |
| 132 | Guide track |
| 133 | Detection device |

The invention claimed is:

1. Reading unit for a document having a control and/or evaluation device incorporating a scanner device for reading a document, with a guide mechanism for the document and with a conveyor device to effect a relative displacement between document and scanner device, in which the control and/or evaluation device has a compensating device containing corrective values to correct the image signals emitted by an optoelectric transducer of the scanner device in real time and the individual corrective values for each optoelectric transducer are determined at least by comparing desired values of a reference document with the actual values of the image signals of the reference document emitted by the optoelectric transducer and permanently stored in a first memory device, characterised in that the first memory device (42) for the corrective values is arranged directly on a scanner head (117) of the scanner device (25) and/or on the optoelectric transducer (34) and forms a single-piece unit therewith having predefined interfaces to the peripheral electronic components, and the control and/or evaluation device (44) is programmed to transfer the corrective data from the first non-volatile memory device (42) into another memory device (46) of the control and/or evaluation device (44) at least during every power-up phase, this other memory device (46) offering the possibility of a relatively faster access and a faster data transfer rate.

2. Reading unit as claimed in claim 1, characterised in that the compensating device (39) is programmed to overlay the image signal (37) with a corrective signal (54) corresponding to the corrective values in the other memory device (46).

3. Reading unit as claimed in claim 1, characterised in that the compensating device (39) has at least one linearizer chip (41), which is electrically connected to another memory device (46) for the corrective values and to the scanner device (25) and is programmed to incorporate the existing corrective values in the analogue image signal (37) arriving from the scanner device (25) in order to produce a corrected image signal (56).

4. Reading unit as claimed in the claim 3, characterised in that the linearizer chips (41) of the compensating device (39) generate the corrected, analogue image signal (56) as digital image data at the output end.

5. Reading unit as claimed in claim 3, characterised in that the linearizer chips (41) are programmed to forward the corrected, digital image data via a computer bus (66) to the control and/or evaluation unit (44).

6. Reading unit as claimed in claim 5, characterised in that an address bus (69) of the computer bus (66) is connected via another buffer memory (73) to the address port of the memory device (46).

7. Reading unit as claimed in claim 3, characterised in that the linearizer chips (41) are programmed to transfer the corrected, analogue image data of the document (2) via the computer bus (66) to the intermediate storage (59).

8. Reading unit as claimed in claim 7, characterised in that the intermediate storage (59) is electrically connected to the control and/or evaluation device (44) via a data bus (66).

9. Reading unit as claimed in claim 8, characterised in that the intermediate storage (59) for the corrected, digital image data is electrically connected to the linearizer chips (41) and the control and/or evaluation device (44) via the data bus (68) is made up of several shift registers (60).

10. Reading unit as claimed in claim 8, characterised in that the data bus (68) is connected via an intermediate buffer memory (74) to the memory device (42) and to the linearizer chip (41).

11. Reading unit as claimed in claim 7, characterised in that the control and/or evaluation device (44), the intermediate storage (59) and the compensating device (39) are arranged on a printed circuit board forming a system of scanner electronics (65) for the reading unit (1), which is electrically connected to the scanner device (25) via predetermined interfaces.

12. Reading unit as claimed in claim 1, characterised in that the control and/or evaluation device (44) comprises a microprocessor (67) and a sequence control device (75).

13. Reading unit as claimed in claim 1, characterised in that the control and/or evaluation device (44) is programmed to forward the read, corrected image data to a higher-level computer (62).

14. Reading unit as claimed in claim 1, characterised in that an interface (61) between the control and/or evaluation device (44) of the reading unit (1) and a higher-lever computer (62) is provided as a Centronics parallel interface or as a universal serial bus (USB) interface.

15. Reading unit as claimed in claim 1, characterised in that the scanner device 25 forms a substantially independent, modular structural unit, which is electrically connected by at least one line connection, in particular a cable (118), to the scanner electronics (65).

16. Reading unit as claimed in claim 1, characterised in that the scanner device (25) is designed as a scanner head (117), which extends transversely to the guide and feed direction—arrow (7)—of the document (2) above the region of the scanning zone.

17. Reading unit as claimed in claim 1, characterised in that the scanner head (117) has a housing frame (120) which houses at least one optoelectric transducer (34), at least one light source (32, 33) and a lens system (35).

18. Reading unit as claimed in claim 17, characterised in that, relative to the guide and feed direction—arrow (7)—the light sources (32, 33) provided as light-emitting diode (LED) strips, are arranged before and after the optoelectric transducer (34) so that the optoelectric transducer (34) is arranged between at least two strip-shaped light sources (32, 33).

19. Reading unit as claimed in claim 17, charaterised in that the optical, electrical and/or optoelectric components of the scanner device (25) are closed off from the surrounding environment by a transparent cover plate (121) on the housing frame (120) to protect them from dust.

20. Reading unit as claimed in claim 19, characterised in that the transparent cover plate (121), made from glass, is in contact with the flat face (92, 93) of the form (3) to be scanned during the scanning process.

21. Reading unit as claimed in claim 19, characterised in that a pressing device (31), which is provided as rotatably mounted roller, presses the form (3) to be read fully and without gaps against a contact surface (30) of the cover plate (121).

22. Reading unit as claimed in claim 21, characterised in that an axis of rotation of the pressing device (31) provided as a pressure roller and a centre axis of the gradient lens (36) and/or the optoelectric transducer (34) lie on a common vertical axis (122).

23. Reading unit as claimed in claim 22, characterised in that the axis of rotation of the pressing device (31) runs parallel with the longitudinal central axis of the lens system (35) comprising a plurality of lenses and/or parallel with a centre axis (90) of the optoelectric transducer (34) provided as CCD-rows.

24. Reading unit as claimed in claim 17, characterised in that the light sources (32,33) are designed to irradiate red light so as to fade out symbols on the document (2) of the corresponding colour.

25. Reading unit as claimed in claim 1, characterised in that at least two light sources (32, 33) are provided in the form of strip lights, which irradiate their light in a direction onto a flat face (92, 93) of the document (2) to be scanned.

26. Reading unit as claimed in claim 1, characterised in that the optoelectric transducer (34) is programmed to convert the light refracted by the respective flat face (92, 93), by means of a plurality of optoelectric elements, into an image signal (37) representing the light conditions at the optoelectric transducer (34).

27. A reading unit as claimed in claim 1, characterised in that the lens system (35) comprises a plurality of gradient lenses (36) disposed, relative to a vertical direction, between the optically scanned flat face (92,93) and the optoelectric transducer (34) provided as a charge-coupled device (CCD) element and the refracted light from the document (2), which is a form (3), reproduced on the individual optoelectric elements thereof.

28. Reading unit as claimed in claim 1, characterised in that a scanner head of the scanner device (25) is mounted in the unit (1) by means of a bearing device (123) so that it is displaceable in translation and/or in rotation.

29. Reading unit as claimed in claim 28, characterised in that the bearing device (123) is an articulated and/or guide mechanism (124) bearing the scanner device (25) so that it is able to rotate about a pivot axis (127) extending parallel with the flat faces (92,93) of the document (2).

30. Reading unit as claimed in claim 1, characterised in that the scanner head (117) is mounted so that it is displaceable in a vertical guide (129) perpendicular to the pivot axis (127).

31. Reading unit as claimed in claim 1, characterised in that the conveyor device (17) comprises a plurality of electric motor-driven drive and/or conveyor rollers (18,19), which displace and guide the document (2), which is a form (3), along a guide path (6) inside the reading unit (1).

32. Reading unit as claimed in claim 1, characterised in that, relative to the guide and feed direction—arrow—(7)— an alignment device (89) is provided before scanner device (25) in order to re-position to a standard orientation incoming documents (2) fed in askew.

33. Reading unit as claimed in claim 32, characterised in that the alignment device (89) has a transverse conveyor device (96) for displacing the documents (2) to be scanned transversely to a stop surface (103) aligned parallel with the normal guide and feed direction—arrow (7).

34. Reading unit as claimed in claim 1, characterised in that the control and/or evaluation device (44) is electrically connected to an output device (105) disposed in the reading unit (1).

35. Reading unit as claimed in claim 34, characterised in that the output device (105) is programmed to apply permanent characters to the document (2) and is provided as a printer unit (106) or a stamping unit (107).

36. Reading unit as claimed in claim 1, characterised in that it is used in a bank and/or lottery terminal and has detection devices (8,26) and/or locking and/or release mechanisms (10), in particular shutters (11) for documents (2).

* * * * *